US012714937B2

(12) United States Patent
Pean

(10) Patent No.: US 12,714,937 B2
(45) Date of Patent: Aug. 25, 2026

(54) GRAPHICS PROCESSING UNIT (GPU) COMMAND STREAMING

(71) Applicant: Netflix, Inc., Los Gatos, CA (US)

(72) Inventor: Gregoire Pean, San Francisco, CA (US)

(73) Assignee: Netflix, Inc., Los Gatos, CA (US)

( * ) Notice: Subject to any disclaimer, the term of this patent is extended or adjusted under 35 U.S.C. 154(b) by 218 days.

(21) Appl. No.: 18/615,289

(22) Filed: Mar. 25, 2024

(65) Prior Publication Data

US 2024/0342595 A1 Oct. 17, 2024

Related U.S. Application Data

(60) Provisional application No. 63/491,955, filed on Mar. 23, 2023.

(51) Int. Cl.
*A63F 13/30* (2014.01)
*A63F 13/355* (2014.01)
(Continued)

(52) U.S. Cl.
CPC .............. *A63F 13/355* (2014.09); *G06T 1/20* (2013.01); *G06T 15/80* (2013.01)

(58) Field of Classification Search
CPC ........ A63F 13/30; A63F 13/32; A63F 13/323; A63F 13/335; A63F 13/35; A63F 13/352;
(Continued)

(56) References Cited

U.S. PATENT DOCUMENTS 10,537,799 B1 * 1/2020 Burke .................. G06T 15/205
2011/0092285 A1 * 4/2011 Yoshino ................ G09G 5/363 463/31

(Continued)

FOREIGN PATENT DOCUMENTS

EP 3862061 A2 8/2021

OTHER PUBLICATIONS

Chuah, et al., "Cloud Gaming: A Green Solution to Massive Multiplayer Online Games", Green Media, 2014 IEEE Wireless Communications, pp. 78-87; 10 pages.

(Continued)

*Primary Examiner* — Omkar A Deodhar
(74) *Attorney, Agent, or Firm* — Hogan Lovells Cadwalader US LLP

(57) ABSTRACT

The disclosed computer-implemented method includes accessing media frame generation input events produced as part of a multimedia application on a media server, selecting at least one media frame that is to be rendered according to the media frame generation input events, determining graphics processing capabilities of a client device on which the selected media frame is to be rendered, and generating a render command for the selected media frame based on the determined graphics processing capabilities of the client device. The render command includes contextual graphics information and graphics processing unit (GPU) pipeline information for use in rendering the selected media frame on the client device. The method also includes transmitting the generated render command to the client device to initiate rendering of the selected media frame using the contextual graphics information and the GPU pipeline information. Various other methods, systems, and computer-readable media are also disclosed.

20 Claims, 8 Drawing Sheets

(51) Int. Cl.
*G06T 1/20* (2006.01)
*G06T 15/80* (2011.01)

(58) Field of Classification Search
CPC ...... A63F 13/355; A63F 13/358; A63F 13/40; A63F 13/44; A63F 13/45; A63F 13/50; A63F 13/52; A63F 13/70; A63F 13/77; A63F 13/79; A63F 2300/209; A63F 2300/40; A63F 2300/407; A63F 2300/53; A63F 2300/534; A63F 2300/535; A63F 2300/538; A63F 2300/552; A63F 2300/60; G06T 1/20; G06T 15/80
See application file for complete search history.

(56) References Cited

U.S. PATENT DOCUMENTS

2013/0024545 A1* 1/2013 Sheppard ....... H04N 21/234318 709/217
2017/0072308 A1* 3/2017 Perry ...................... A63F 13/77
2019/0364302 A1* 11/2019 Perlman ............... H04N 19/436
2023/0016473 A1* 1/2023 Panwar ................ H04N 19/127

OTHER PUBLICATIONS

International Search Report and Written Opinion for PCT Application No. PCT/US2024/021349, mailed Aug. 29, 2024; 11 pages.

* cited by examiner

GRAPHICS PROCESSING UNIT (GPU) COMMAND STREAMING

CROSS-REFERENCE TO RELATED APPLICATIONS

This application claims priority to and the benefit of U.S. Provisional Patent Application No. 61/797,369, filed on Mar. 23, 2023, which application is incorporated by reference herein in its entirety.

BACKGROUND

Cloud-based gaming has steadily increased in popularity over time. In such scenarios, video game graphics and other associated data are typically rendered on remote, cloud-based servers and are then transmitted to gaming clients where the data are decoded and displayed on a client device. When processing this video game data, graphics processing units (GPUs) on the remote servers implement multiple different hardware components, including rendering and encoding components. In traditional cloud gaming systems, images are rendered on the remote server, encoded, compressed, and transmitted to the client device. This process results in a large amount of data being generated and transferred between the cloud gaming servers and the client device. As such, cloud-gaming providers require large amounts of energy, a large number of servers, and higher resource costs associated with generating those images. This can lead cloud-gaming providers to a model that is not economically viable for some games. This relatively large amount of data can also result in laggy game play and suboptimal response times. This, in turn, may lead to reduced interest in playing the cloud-based games.

SUMMARY

As will be described in greater detail below, the present disclosure provides methods and systems for streaming or transmitting graphics processing unit (GPU) commands in a highly efficient manner. In some cases, the GPU commands may be transmitted instead of fully rendered video frames, potentially leading to a large reduction in the amount of data transmitted over the network between a remote server and a client device.

In one embodiment, a computer-implemented method is provided, which includes: accessing media frame generation input events produced as part of a multimedia application on a media server, selecting at least one media frame that is to be rendered according to the media frame generation input events, determining the graphics processing capabilities of a client device on which the selected media frame is to be rendered, generating a render command for the selected media frame based on the determined graphics processing capabilities of the client device, wherein the render command includes contextual graphics information and graphics processing unit (GPU) pipeline information for use in rendering the selected media frame on the client device, and transmitting the generated render command to the client device to initiate rendering of the selected media frame using the contextual graphics information and the GPU pipeline information.

In some embodiments, the selected frame is a video frame. In other embodiments, the selected frame is an audio frame. In some cases, the multimedia application is a video game. In some examples, the generated render command is sent to a video game engine running on the client device.

In some cases, the contextual graphics information includes vector data for meshes, vector data specifying positions (also known as vertex buffers), or 2D/3D texture information, or other non-vector 2D/3D information. In some embodiments, the GPU pipeline information includes vertex shader, fragment shader, or any other shader information or shader program to be used. In some embodiments, the GPU pipeline information includes texture sampler configuration information, viewport size, scissor rectangle, blending mode, or stencil information. In some cases, the method further includes compressing the contextual graphics information and the GPU pipeline information prior to transmission to the client device. In some examples, client devices that have increased processing capabilities receive at least one additional portion of contextual graphics information or GPU pipeline information (such as increased viewport dimensions) for use in rendering the selected media frame.

In some embodiments, the contextual graphics information includes 3D depth information, providing support for client devices having 3D display capabilities. In some cases, the contextual graphics information includes different graphics information for each eye of a user since the graphics information describes a full 3D scene and two associated viewports. In some examples, the render commands are generated on a distribution server that is within a specified physical distance from the client device. In some embodiments, the media server controls the multimedia application's runtime.

In addition, a corresponding system includes at least one physical processor, and physical memory comprising computer-executable instructions that, when executed by the physical processor, cause the physical processor to: access media frame generation input events produced as part of a multimedia application on a media server, select at least one media frame that is to be rendered according to the media frame generation input events, determine graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

In some embodiments, the transmitted render commands allow the client device to start the game without an installation phase and substantially without delay. In some cases, the method further includes adapting the contextual graphics information based on the graphics processing capabilities of the client device. In some examples, adapting the contextual graphics information based on the graphics processing capabilities of the client device includes translating shader information to a format that will be understood by the client device. In some cases, adapting the contextual graphics information based on the graphics processing capabilities of the client device includes reducing a feature set in the contextual graphics information to provide a reduction in processing scope on the client device. In some cases, the multimedia application includes a video game, and the generated render command is sent to a video game engine running on the client device.

In some examples, the above-described method is encoded as computer-readable instructions on a computer-readable medium. For example, the computer-readable medium may include computer-executable instructions that, when executed by at least one processor of a computing device, cause the computing device to access the media frame generation input events produced as part of a multimedia application on a media server, select at least one media frame that is to be rendered according to the media frame generation input events, determine one or more graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
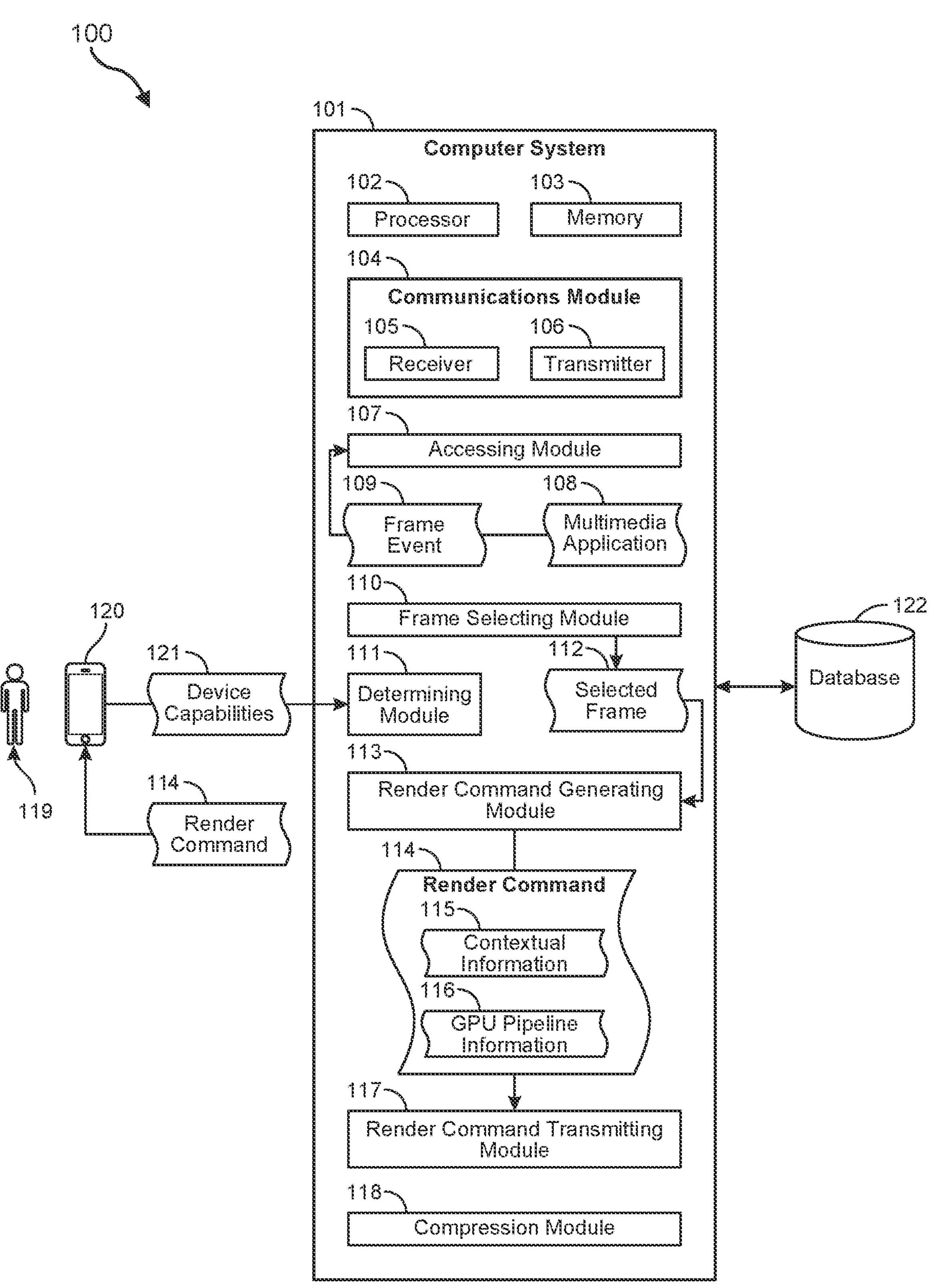
FIG. 1 illustrates a computing environment in which the embodiments herein are designed to operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems for streaming graphics processing unit (GPU) commands in a highly efficient manner. As noted above, applications, such as video games, are often hosted remotely on cloud computing systems. These cloud computing systems are often designed to render and encode graphics for gaming clients (e.g., smartphones or laptops, etc.). As part of generating these gaming graphics, cloud computing systems often implement multiple simultaneous GPUs to render and encode video frames. This process necessitates large amounts of computing power and similarly large amounts of networking bandwidth to transmit the rendered and encoded frames to the client device. Still further, these large data transmissions cause the cloud games to be vulnerable to intermittent or low-rate data connections. Such connections may result in laggy games and poor response times to user inputs. This, in turn, may reduce the amount of time that users spend playing the cloud games. Moreover, in some instances, compute power requirements concentrated on the server side may additionally render cloud gaming not economically viable to reach a very high number of concurrent players.

In contrast to traditional cloud-gaming schemes in which rendering occurs on remote, cloud-based servers, the embodiments herein generate GPU render commands that are transmitted to the client device. These GPU render commands include information that specifies how a video frame is to be rendered and allows the client device itself to perform the rendering. Then, instead of transmitting a fully rendered and encoded video frame over the network, the cloud-based servers may instead generate only the information necessary to render a video frame on a client device and transfer that data over the network to the client. This results in a substantial reduction in the amount of compute power needed on the server side and further results in a substantial reduction in the amount of data transmitted over the network to the client device. Such embodiments provide the benefits of a cloud-hosted game (e.g., little or no installation or client-side updating, central hosting that reduces cheating and hacking, etc.), while also reducing the amount of computing and data transfer performed by the cloud-based system.

Moreover, because the systems herein are designed to take advantage of the increased processing capabilities of client devices, the graphics rendered using the GPU render commands may be higher in quality than pre-rendered, compressed video frames. In at least some cases, the systems herein determine which client device is playing the game, determine what the device's graphics processing capabilities are, and then stream GPU render commands to that device that are specific to that device's capabilities. This optimizes both cloud-side and client-side computations and network transmissions, providing a remote gaming platform that experiences less lag and better graphics than traditional systems. These embodiments will be described in greater detail below with regard to FIGS. 1-8.

FIG. 1 illustrates a computing environment 100 that includes a computer system 101. The computer system 101 includes software modules, embedded hardware components such as processors, or includes a combination of hardware and software. The computer system 101 includes substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 also includes an accessing module 107. The accessing module 107 is configured to access media frame generation input events 109 that are produced as part of a multimedia application 108 running on a media server. In some embodiments, the computer system 101 is a media server, while in other cases, the computer system 101 communicates with other media servers. In some embodiments, the multimedia application 108 is a video game (e.g., a cloud-based video game or remote video game), while in other cases, the multimedia application 108 is a video streaming application, an audio streaming application, an image viewing application, or other media-based software application.

The accessing module 107 is configured to generate media frame generation input events 109 as part of the multimedia application 108. The media frame generation input events 109 include instances in which a media frame is generated. This process entails generating the information necessary to render a frame on a client device. In some cases, the media frame generation input event 109 indicates the initiation of a frame generating event, indicating that a frame for a video game (or for a video or audio file) is to be generated. After this initiation process, the frame selecting module 110 then selects a frame 112 that is to be rendered based on the media frame generation input event 109.

After the specific frame 112 has been selected by the frame selecting module 110, the determining module 111 of computer system 101 determines a client device's graphics processing capabilities 121. It should be noted here that any of these steps may be performed in the order described or in a different order. Thus, for example, in some cases, the determining module 111 determines the client device's graphics processing capabilities 121 before the media frame generation input event 109. Each client device (e.g., 120, used by user 119) has its own general processor(s) and graphics processor(s). Moreover, each client device has its own memory (e.g., RAM), data storage, wireless radios (or network cards), cellular service or internet service provider, and other hardware or software or network limitations. Accordingly, the determining module 111 of computer system 101 is configured to identify the client device's capabilities 121, including general processing capabilities, graphics processing capabilities, memory capabilities, storage capabilities, network capabilities, and other abilities of the client devices to receive, transfer, and process data. These capabilities may then be noted in database 122.

Using the determined device capabilities 121, the render command generating module 113 of computer system 101 generates a render command 114 for the selected media frame 112. The render command generating module 113 generates the render command 114 based on the determined graphics processing capabilities of the client device 120. In some cases, this includes increasing or decreasing the quality and/or dimensions of the graphical resource, like for example reducing or increasing texture sizes, or compressing the graphical resources with more or less visual lossiness, all based on the client device's ability to handle the increase or decrease in quality and the transmission medium's ability to handle more or less data. The render command 114 includes contextual graphics information 115 and graphics processing unit (GPU) pipeline information 116 needed to render the selected media frame 112 on the client device 120, based on its determined device capabilities 121. The render command transmitting module 117 then transmits the render command 114 to the client device 120 for rendering, potentially after the render command 114 is compressed for transmission by the compression module 118. The contents of the contextual graphics information 115 and the GPU pipeline information 116, along with the other elements and embodiments explained above, will be described further below with regard to method 200 of FIG. 2.

Figure 2:
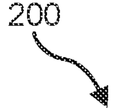
FIG. 2 is a flow diagram of an exemplary method for streaming or transmitting graphics processing unit (GPU) commands in a highly efficient manner.
Figure 2:
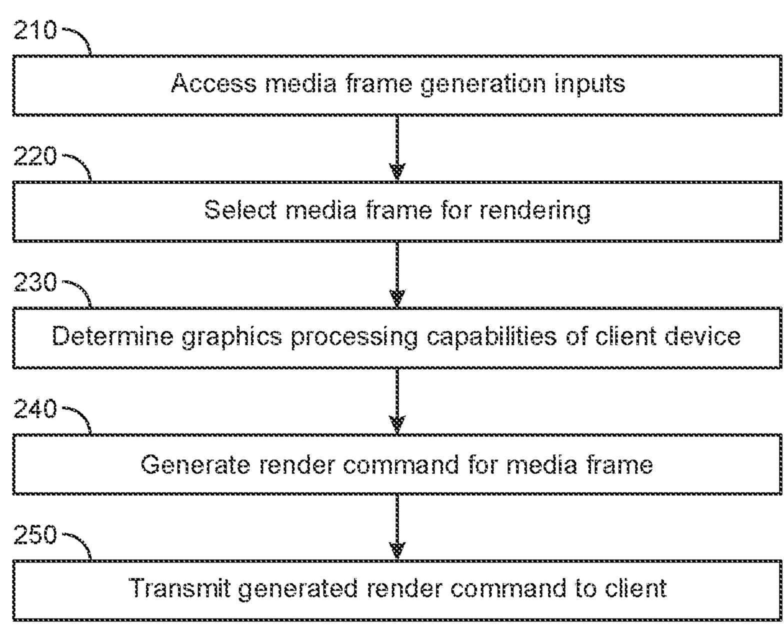

FIG. 2 is a flow diagram of an exemplary computer-implemented method 200 for streaming or transmitting graphics processing unit (GPU) commands in a highly efficient manner. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, a computer-implemented method 200 may be provided that includes: accessing, at step 210, one or more media frame generation input events 109 produced as part of a multimedia application 108 on a media server. The method 200 further includes, at step 220, selecting at least one media frame 112 that is to be rendered according to the one or more media frame generation input events 109 and determining, at step 230, one or more graphics processing capabilities 121 of a client device 120 on which the selected media frame 112 is to be rendered.

The method 200 also includes, at step 240, generating a render command 114 for the selected media frame based on the determined graphics processing capabilities 121 of the client device 120, where the render command includes contextual graphics information 115 and GPU pipeline information 116 for use in rendering the selected media frame 112 on the client device 120. The method 200 further includes, at step 250, transmitting the generated render command to the client device to initiate rendering of the selected media frame using the contextual graphics information and the GPU pipeline information.

The term "command streaming," as used herein, generally refers to the concept of recurrently sending, to a client device, render or compute GPU commands that traditionally would have been submitted to a server's GPU. In this manner, the media server may not use or require a GPU device and may, instead, leverage the GPU (and/or CPU) of the client device. The embodiments herein are designed to identify and send the contextual information required to perform a draw (or GPU compute task) to another process on the client device and let that process (and/or the client device's GPU/CPU) perform the identified tasks.

In at least some embodiments, command streaming functions by intercepting graphics API calls (e.g., Vulkan calls)

of an application process (e.g., a video game process or video game application), potentially adapt them when needed (e.g., serialize, translate, or otherwise adapt the API calls), and transmit the API calls (e.g., using a specified protocol that may be suited for such data transmissions) over to a receiver process that will decode and emit new or corresponding graphics API calls, in turn, to the local GPU on the client device. Notably, the embodiments herein contemplate much more than merely performing remote procedure calls (RPCs). Instead, the systems herein implement and manage logic and state on both sides of the data stream from server to client. The identified logic and state transmitted to the client device pertain to GPU memory management and resource management, resource caching, resource compression, graphics API adaptations (e.g., depending on server/client implementation mismatches, such as shader translation), and high-level logic associated with the serialization of relatively complex data structures at high frequency.

GPUs are typically asynchronous processing units. A system submits render or compute jobs to queues, and those jobs get executed when possible (i.e., when a graphics or compute engine of the GPU is available to perform the job). The system will then get notified (via fence or semaphore objects or via explicit or implicit command or resource dependencies when the job is done. Command streaming, as presented herein, is an extension of that queueing and asynchronicity and an extension of that dependency management. Sending a command from one process to another is performed asynchronously, and typically will not require a response. Or, that response or completion signal can come later (much later if the commands are sent over the network).

The term "cloud game" or "cloud-based game" may refer to any type of video game provided over a local network and/or over the internet where a backend server provides at least some of the data used to play the game. In some cases, cloud-based servers may render and encode the video frames that are sent to the client device 120 for display to the user. In other cases, including the embodiments described herein, the cloud-based servers may receive inputs and calculate changes to the game, while offloading some or all of the video rendering to the client device.

The cloud games or other multimedia applications (e.g., video streaming, audio streaming, interactive content, etc.) may be processed by the computer system 101. When the computer system is initiating the frame generation process as part of a multimedia application 108, the frame selecting module 110 selects certain frames 112 (or all incoming frames) that are to be rendered by the client device 120. These frames may be video frames or audio frames and may be part of a video game, part of a movie, part of a song, or part of other content.

Figure 3A:
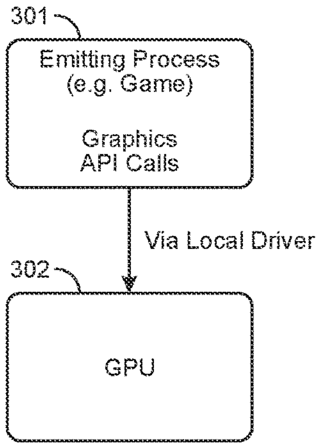
FIGS. 3A and 3B illustrate alternative computing environments in which the embodiments herein are designed to operate.
Figure 3B:
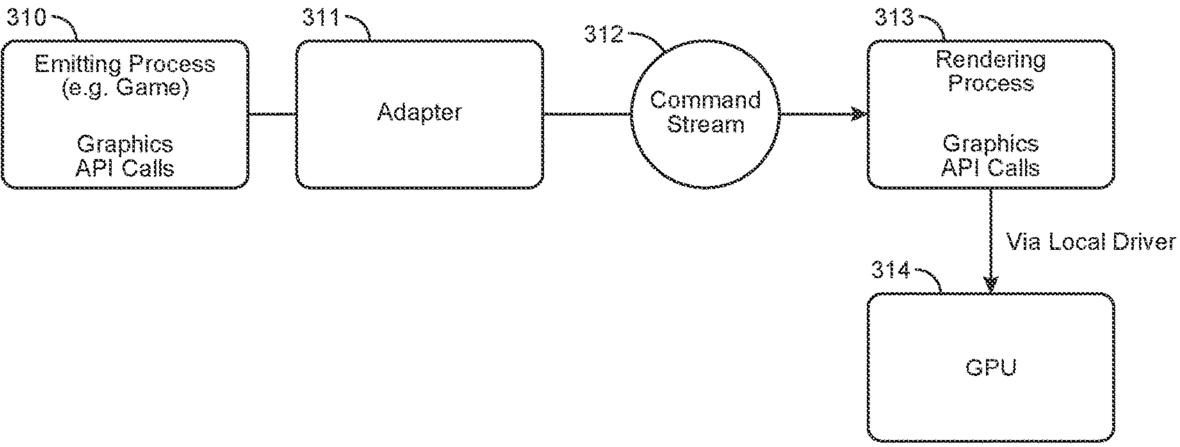

FIG. 3A describes an embodiment in which an emitting process 301 (e.g., a video game, such as multimedia application 108) generates graphics API calls. These traditional graphics API calls generated by the emitting process 301 are then sent to the local GPU 302 on the media server and are processed by a local driver on the GPU. This is the process that would typically occur in a traditional cloud gaming platform. In contrast to this scenario, the embodiment shown in FIG. 3B illustrates the use of a command stream 312 and an adapter 311. Instead of the graphics API calls being sent to a local GPU 302 on the server, the emitting process (e.g., a video game) 310 sends the graphics API calls to an adapter 311 on the server. The adapter 311 serializes, translates, or otherwise changes the graphics API calls for transfer, via a command stream 312, to a rendering process 313 on the client device. The rendering process 313 then sends the modified graphics API calls to the client device's local GPU 314 for rendering on the client device.

A render command, or "draw call" specifies which tasks a GPU pipeline is to perform and how the GPU pipeline is configured. At least in some cases, the draw call is an order from the emitting process (e.g., a video game) 310 to render and rasterize a specified geometry using a given context (similarly, for compute commands, to compute various data using a compute kernel and specified inputs and outputs). In the embodiments herein, render commands will carry an extensive description or context with them. In some examples, the render commands indicate which geometry or input vectors to use for the draw, which shaders to use, which constant shader input values (uniforms) to use, which resources (e.g., textures, buffers) to use or bind to shaders, which texture samplers to bind textures to, which texture sampler parameters to use, which depth testing configuration is to be used, which blending mode, viewport size, or other pipeline settings are to be used, etc., along with which target frame-buffer references (render target) to render to.

These render compute commands are typically relatively small in size, especially when compared to a fully pre-rendered bitmap or encoded video frame. This is due, at least in part, to the references and reuse of pre-existing and previously set up shaders, resources, objects, and/or buffers. Indeed, once these shaders, resources, objects, buffers, or other objects have been loaded onto a client device, the command stream 312 instructions may be sufficient to cause the generation of high-quality images on a client device while transmitting substantially less data than would be transmitted in a fully rendered video frame.

At least in some embodiments, client command streaming will implement a protocol that is appropriate for transmitting this type of data. In some cases, the protocol is a compact transport protocol, designed for low latency with some potential for tolerating loss (e.g., web real-time communication (WebRTC), stream control transmission protocol (SCTP), real-time transport protocol (RTP), quick UDP internet connections (QUIC), etc.). In some cases, the transmitted data is compressed prior to transmission. Additionally, in client command streaming, at least some of the data may be adapted prior to transmission. The adaptations include graphics API adaptations or changes that align with the client device or client GPU specifics.

Client command streaming (CCS) allows for a reduction in media server GPU load and associated costs to customers that may access the server. Client devices with larger GPU capabilities (personal computers, laptops, high-end smartphones, etc.) receive an upgraded experience without incurring additional cost for the provider of the media server. In such cases, the user's experience on the client device can scale according to the client device's CPU and/or GPU capabilities. In some embodiments, client command streaming supports three-dimensional (3D) displays such as virtual reality displays, 3D TVs, or other 3D displays.

Still further, client command streaming allows a media server CPU to run the underlying game logic (as opposed to a farm of GPUs). As such, cloud games may be run on distribution servers that are physically located closer to the client devices, reducing connection latency. Still further, by not taking the time to render and perform encoding on a video frame before transmitting that frame, the media server may experience a reduction in latency (e.g., ~10 ms) by avoiding this processing. Client command streaming also permits cloud-based games to be run at internet service provider (ISP) sites, resulting in a further reduction in latency. This, in turn, leads to a higher quality of experience (QoE) and potentially to higher user satisfaction with the media provisioning service.

The embodiments herein provide a lossless way to encode an entire 2D or 3D scene efficiently, which bitmaps do not allow. For example, the systems described herein can render a large portion of high-fidelity text using only pointers to distance fields and/or texture atlases. Those pointers take only a small fraction of what this text would have taken to transmit via video coding. Client command streaming also provides improved control over video quality. The system can decide to selectively send some textures with reduced size or with some compression lossiness. This decision, at least in some embodiments, is made dynamically, texture by texture.

When compared to installing and running games fully on the client device (e.g., mobile games, or games installed on a so-called smart TV), client command streaming allows the game to start substantially immediately, as soon as any primary assets have been transferred, since there is no heavy installation phase. Moreover, similar to streaming video on demand (SVOD) or video-based cloud gaming, CCS allows transmission of a minimal amount of assets, and then only transmitting what is needed for the current scene or level. CCS also provides near-infinite scalability in terms of game size. CCS games are not bound or restricted by device storage capacity or other similar limits. Updates to CCS games can be rolled out seamlessly for consumers. Indeed, CCS games can be updated as often as required, substantially without requiring updates on the client device. CCS also allows the provider of the game to control or own the execution of the game. This allows the provider to reduce a malicious user's ability to create cheats for the game and provides a higher ability to detect such cheats. The CCS game engine can audit player behavior, track all inputs, etc. Game value is better preserved as users cannot redistribute the games themselves and cannot pirate or hack the CCS games.

Within the client command streaming (CCS) umbrella, various other command streaming topologies will be defined, each having a different set of requirements and associated benefits. For example, disaggregation command streaming (DCS) makes it possible to run any processes that require a GPU (e.g., game graphics processes) on a different node, different server, or different environment (e.g., in a different container or on a virtual machine (VM)) than where the target GPU is located (e.g., the client device). Since DCS is for use within the same machine, chassis, or within the same infrastructure, disaggregation command streaming requires less effort (e.g., CPU resources) to make the transmission stream the most compact, or most space efficient, or most bandwidth efficient. At least in some embodiments, a reliable transport protocol is implemented in DCS (e.g., IPC or TCP). Moreover, at least in some cases, DCS transmissions are "Vulkan-to-Vulkan" and, thus, will not implement graphics API adaptations.

DCS may allow for more flexibility when designing the cloud games' infrastructure (hardware and software wise). For example: if the systems herein are to run cloud games on a given appliance, these systems can perform rendering on another nearby appliance, run game logic on a x86 CPU, perform rendering on an advanced RISC machines (ARM) system on a chip (SoC) in the same chassis (for cross compatibility or backward compatibility), and run games in a virtual machine, instead of a container. These DCS embodiments can also enhance infrastructure utilization by separating maximization of CPU usage vs. GPU usage and/or being able to scale resources distinctly. This may make content steering easier, since separating or splitting steering dimensions is more secure, more portable, and more fault tolerant, as the systems herein do not expose the GPU device node and drivers inside the container. Moreover, the systems herein can audit or filter each (Vulkan) API call.

In some embodiments, hybrid client command streaming (HCCS) may be implemented to generate and transfer render commands to a client device. In the HCCS topology, the underlying system may generate some render commands on a distribution server (different from the media server (see FIG. 5)) and generate some render commands on the client. For example, text or heads up display (HUD) information is a layer that is rendered on the client device. In cases involving such text or HUD information, lower fidelity elements are rendered on the distribution server and sent as video (using a traditional cloud gaming pipeline) and shown on the client in a video layer or plane underneath the graphics plane. This layering or hybrid model may be well suited for particular cloud games and may alleviate some GPU load from the distribution server. HCCS can also be used to ensure that text or UI or menu elements remain legible within a user interface. Still further, within HCCS, synchronization is carefully managed, as video information may arrive later than the command stream. As such, HCCS will synchronize the text and video streams over the network.

In some embodiments, tracing command streaming TCS may be implemented to generate and transfer render commands, either alone or in combination with CCS and HCCS. Tracing command streaming provides the ability to dump a command stream to persistent storage in order to be able to replay it later, as many times as desired, in a deterministic manner. TCS allows a game session playthrough to be recorded in order to automate testing. Still further, TCS tracks stack performance regressions accurately, facilitates performance optimizations, and improves debugging. TCS also allows the system to reliably capture a performance profile of the same game or same game playthrough on different hardware.

In such cases, TCS fixes the workload and makes the workload reproducible, which allows the system to then check precisely for hardware differences, and which allows the system to automate the gathering of large datasets for training an ML model. TCS is also more reliable and/or more deterministic than recording input events. TCS provides the ability to share trace files and collaborate on trace files. Accordingly, systems no longer need large sets of instructions to reprogram a failing or problematic game sequence. TCS also provides the ability to save and replay game sequences for customers or to build features around game saves or replays.

In at least some embodiments, combination command streaming (XCS) is provided and implemented. This combination command streaming combines DCS, CCS, and TCS to provide a complete cloud gaming experience, without rendering and encoding video frames on the media server. XCS provides the ability to disaggregate the game process execution environment from processes that perform the rendering, provides the ability to project further and perform client command streaming if the client and/or game combination allows for such streaming, and provides the ability to capture and/or replay an existing game sequence.

In addition to the benefits listed above regarding DCS, CCS, and TCS, XCS adds the following: being able to dynamically switch or simultaneously support video based cloud games and CCS-based cloud games, either during development, or at runtime (based on transport protocol negotiation outcome for example), create a unified development and innovation vehicle (e.g., a single, modular rendering and forwarding process that can support multiple cloud gaming use cases, multiple hardware setups, multiple container setups, etc.), including CCS-based cloud gaming. At least in some cases, having a forwarding daemon or having two-stage command streaming means that the systems herein can develop, refine, and debug the first stage command streaming (e.g., Vulkan to Vulkan), ensure solidity of the system's virtual resources or virtual random-access memory (VRAM) manager, etc., before adapting, reducing, or projecting to the client device or implementing client command stream.

Video-based cloud gaming may implement a central rendering daemon for implementing various projects, including frame buffer pooling, render context sharing, viewport sharing, improved command submission scheduling, vendor-agnostic VRAM resource deduplication, etc. This may allow for and ensure long-term convergence and alignment in terms of product features between video-based cloud gaming and CCS-based cloud gaming.

Figure 4:
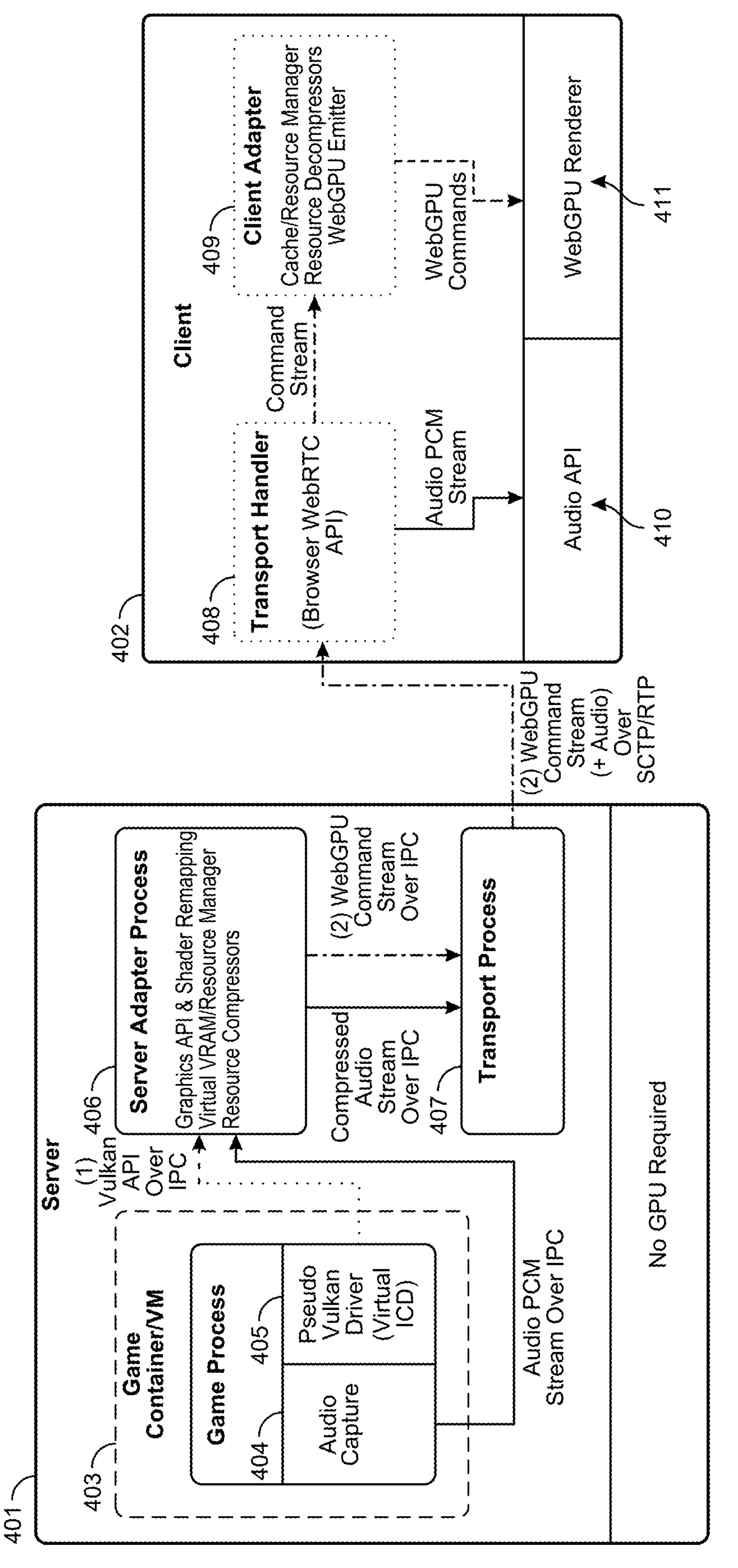
FIG. 4 illustrates an embodiment in which frame rendering may be transferred to a client device.

Turning now to FIG. 4, a computing architecture 400 is provided that allows render commands to be generated on a server and transmitted to a client for rendering on the client device. For example, the server 401 may implement various hardware or software modules to generate a render command stream and transfer those render commands (e.g., from 407 to 408 via a transport protocol such as SCTP or RTP) to client device 402. On the server 401, a game container 403 or virtual machine is configured to run a game process (or multiple game process instances). The game process includes a game support layer (GSL) 404 and a pseudo-Vulkan driver (e.g., a virtual installable client driver (ICD)) 405. The pseudo-Vulkan driver 405 is designed to implement some (or all) of the Vulkan APIs generated as part of the cloud game. The pseudo-Vulkan driver 405 will relay or send those API calls outside of the container or VM to the server adapter process 406, where graphics API and shader remapping occurs, along with compression and memory management.

At least in some embodiments, the server adapter process 406 or cloud game pipeline manager is configured to translate and adapt the Vulkan command stream to a specific protocol's command stream (e.g., webGPU's command stream, or other client or target graphics APIs), write or emit trace files, track graphics resources and residency status, maintain a virtual VRAM model, track the interdependence of graphics resources and commands, compress GPU resources according to the best available or most appropriate scheme, perform or model VRAM or GPU resource deduplication, handle color space conversion and video encoding using a local hardware encoder, handling audio encoding, and performing other tasks. The transport process 407 receives the compressed audio stream and protocol-specific render command stream via inter-process communication or some other means. The transport process 407 is configured to reuse the transport implementation from the game service manager, receive prepared command blobs to send, directly from the server to the adapter process 406, and/or to encode audio or video bitstreams.

The transport handler 408 receives these render commands and passes the audio to an audio API 410. The render commands stream is passed to the client adapter 409. The client adapter 409 or client-side renderer may be configured to run both in RDP and in a browser. The client adapter 409 may decompress the received data, allocate computing resources for processing the render commands, and then carry out the render commands to render video frames on the client device 402 (e.g., using the webGPU renderer 411).

In some embodiments, the server 401 and/or client device 402 are configured to gather per-game and per-device performance data while generating and processing the render commands. The server 401 can then use machine learning to project how satisfactorily a game will run on a given client device (and whether running the game is at all possible). An associated ML model will be trained to recognize, based on past client devices and past gaming sessions, which games will run acceptably well on which devices. In some cases, various thresholds or benchmarks are established to ensure that a client device has the minimum GPU and/or CPU resources to acceptably process a game with a minimum number of frames per second, for example. The ML model may be continuously refined to update the system's understanding of client device performance by learning from actual runs in the field.

In addition to raw GPU performance, other dimensions may be accounted for, such as available VRAM or similar. In a similar manner, the systems herein may perform characterization or profiling tests to build a functional understanding of what each cloud-based game requires in terms of computing resource capabilities (e.g., GPU, compute, features, VRAM, ratio of resources being streamed vs. immutable resources, etc.). In some cases, this involves leveraging the telemetry infrastructure, including gaming session statistics, with various GPU profiling and performance counters enabled.

As noted above, the command streaming described herein may be used with video content, audio content, video games, still images, or other media items. As further noted above, the contextual graphics information sent as part of the render command to the client device may include vector data for meshes, vector data specifying object positions, vertex buffers, bitmap 2D/3D information, non-vector 2D/3D information, or other information used to render the video frame or audio frame on the client device. In some cases, GPU pipeline information, which may be sent in addition to the contextual graphics information, includes texture sampler configuration information, viewport size information, blending mode, scissor rectangle, stencil information, or other data used by the GPU when rendering a frame. In some cases, the contextual graphics information and/or the GPU pipeline information are compressed by the media server or distribution server prior to transmission to the client device.

Figure 5:
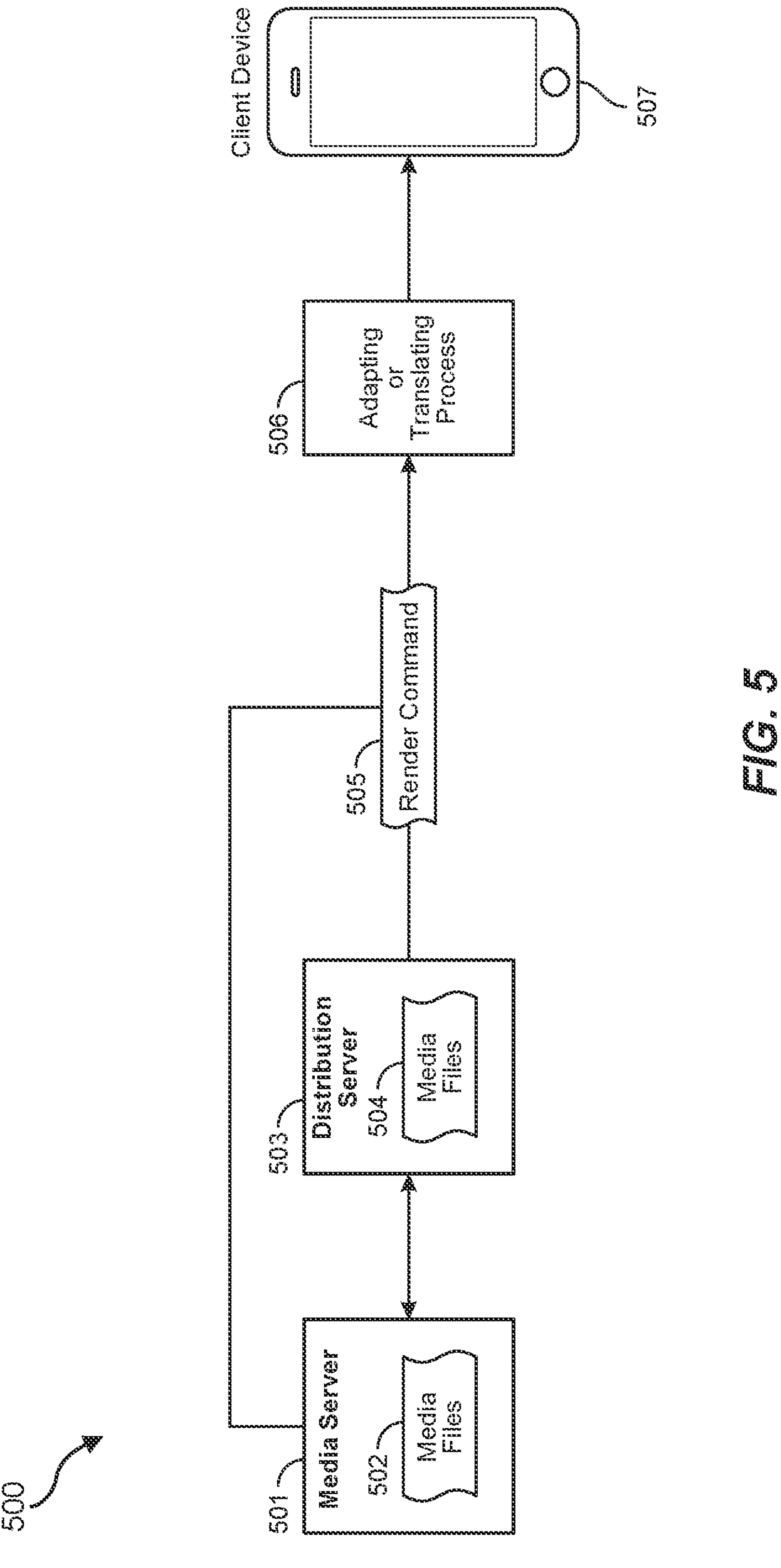
FIG. 5 illustrates an embodiment in which a media server or a distribution server may adjust or translate render command parameters for a specific client device.

For instance, as shown in computing environment 500 of FIG. 5, a media server 501 is configured to generate render commands 505 and send those commands to a client device 507. In some cases, the media server 501 generates and sends the render commands 505 directly to the client device, while in other cases, a distribution server 503 that is physically closer (in some cases, within a specified distance (e.g., 1 mile, 5 miles, 10 miles, 50 miles, etc.)) to the client device generates and sends the render command (e.g., hybrid client command streaming described above). In some embodiments, the render command includes contextual graphics information and/or GPU pipeline information that needs to be adapted or translated to be understood by the client device 507 or by a video game engine that is running on the client device. Thus, in such cases, the render command 505 is sent to an adapting or translating process 506 where the information is appropriately translated or adapted into a form that will be recognized by the client device and/or the video game engine that is running on the client device 507.

Additionally or alternatively, the contextual graphics information sent with the render command 505 includes 3D depth information. This 3D depth information, along with potentially other 3D information, provides support for client devices that have 3D display capabilities. Thus, for instance, if the client device 507 is an artificial reality or virtual reality device or smart television or other device that has 3D capabilities, the 3D depth information sent with the render command 505 will allow the client device to reproduce the video game or scene in three dimensions. In such cases, the contextual graphics information may also include additional viewport information, for the second eye of the user. The different information being presented to each eye allows the user to see three-dimensional images. The depth information and different signals for each eye may still be smaller in size than traditionally rendered and encoded video frames transferred over the network.

As noted above, the client device 507 may be any of a variety of different electronic devices, including smartphone, smart tv, PC, laptop, AR/VR device, smartwatch, gaming console, or other electronic device. In some embodiments, client devices that have increased processing capabilities can receive additional portions of contextual graphics information and/or GPU pipeline information for use in rendering the selected media frame. This may include higher viewport size (e.g., game resolution), more complex shader programs, higher quality texture sampler configuration information, larger vertex buffers, higher density meshes, higher resolution, etc. Because the client device has a better GPU, a better CPU, more memory, or other increased processing capabilities, the client device can handle and process the increased information. The media server 501 may send the additional contextual information or GPU pipeline information when generating the render commands 505 for media files 502. Similarly, the distribution server 503 media server 501 may send the additional contextual information or GPU pipeline information when generating the render commands 505 for media files 504.

In some embodiments, the transmitted render commands (e.g., 505) allow the client device 507 to start the video game without an installation phase and substantially without delay. Because the client device 507 renders the video frames on demand, based on the render command 505, the client device 507 can start the video game without a long initial installation and can start gameplay without a long loading phase. At least in some cases, the video game may be run without installation and substantially without delay (e.g., instantaneously, after the video game has been started) due to the media server's control of the video game's runtime. In such examples, because the media server 501 (or the distribution server 503) controls the video game's runtime, the media server can initialize and run the video game in an efficient manner that allows for a very fast start. In such scenarios, because the media server 501 controls the video game's runtime, the media server can also implement changes within the video game in real time as the user is playing the game.

During the process of generating and transmitting render commands 505, the adapting or translating process 506 may adapt or translate the contextual graphics information in some manner. In some embodiments, the amount of adaptation may be increased or decreased based on the graphics processing capabilities of the client device 507. For example, in some cases, adapting the contextual graphics information based on the graphics processing capabilities of the client device 507 includes translating shader information to a format that will be understood by the client device. In such cases, more or less shader information may be provided to the client device 507 based on its processing capabilities.

In other cases, where the processing capabilities of the client device 507 are reduced, adapting the contextual graphics information based on the graphics processing capabilities of the client device may include reducing a feature set in the contextual graphics information to provide a reduction in processing scope on the client device. This allows the client device to render graphics at a level of detail that is appropriate for the client device 507 and allows the device to operate in a manner that presents a smooth flow of video frames (e.g., 30 fps, 60 fps, 120 fps, etc.) to the user.

In at least some embodiments, a failsafe mechanism may be implemented. This failsafe mechanism ensures that, if a particular video game or video or audio file will not work for a specific client device, the media server 501 or the distribution server 503 will begin rendering and encoding video frames for transfer to the client device. Thus, in cases where command streaming is not working properly or is not an option, the failsafe mechanism will be engaged on the media server 501, and the client device 507 will receive fully rendered and encoded video frames. Moreover, in such cases, the media server 501 may communicate to the user, via the client device 507, that the game or game engine uses patterns that make it incompatible or inefficient with command streaming. In such cases, the user will be made aware that fully rendered and encoded video frames will be transferred over the network and that the corresponding increase in network traffic may affect gameplay.

In addition to the method and corresponding embodiments described above, a corresponding system includes at least one physical processor, and physical memory comprising computer-executable instructions that, when executed by the physical processor, cause the physical processor to: access media frame generation input events produced as part of a multimedia application on a media server, select at least one media frame that is to be rendered according to the media frame generation input events, determine graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

In some examples, the above-described method is encoded as computer-readable instructions on a computer-readable medium. For example, the computer-readable medium may include computer-executable instructions that, when executed by at least one processor of a computing device, cause the computing device to access the media frame generation input events produced as part of a multimedia application on a media server, select at least one media frame that is to be rendered according to the media frame generation input events, determine one or more graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

Figure 6:
FIG. 6 is a block diagram of an exemplary content distribution ecosystem.
Figure 6:
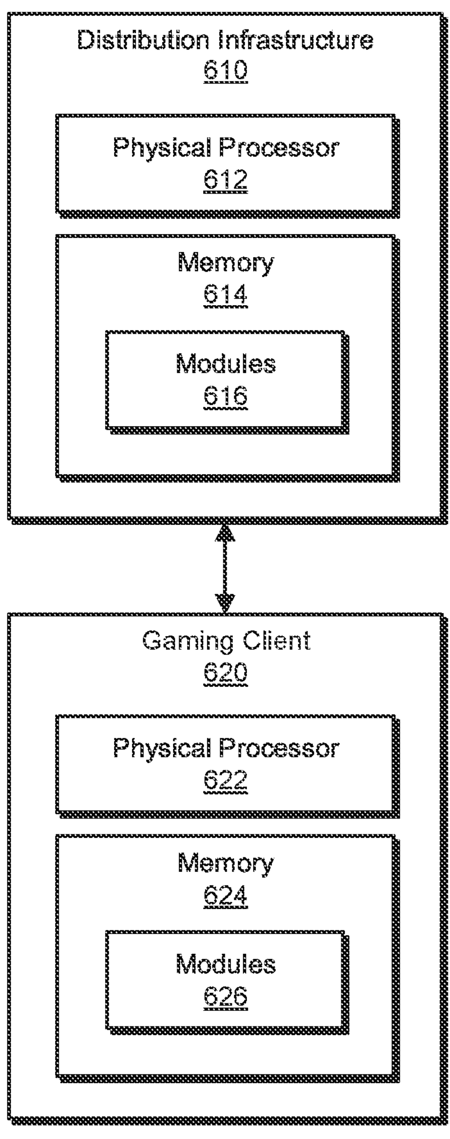
Figure 7:
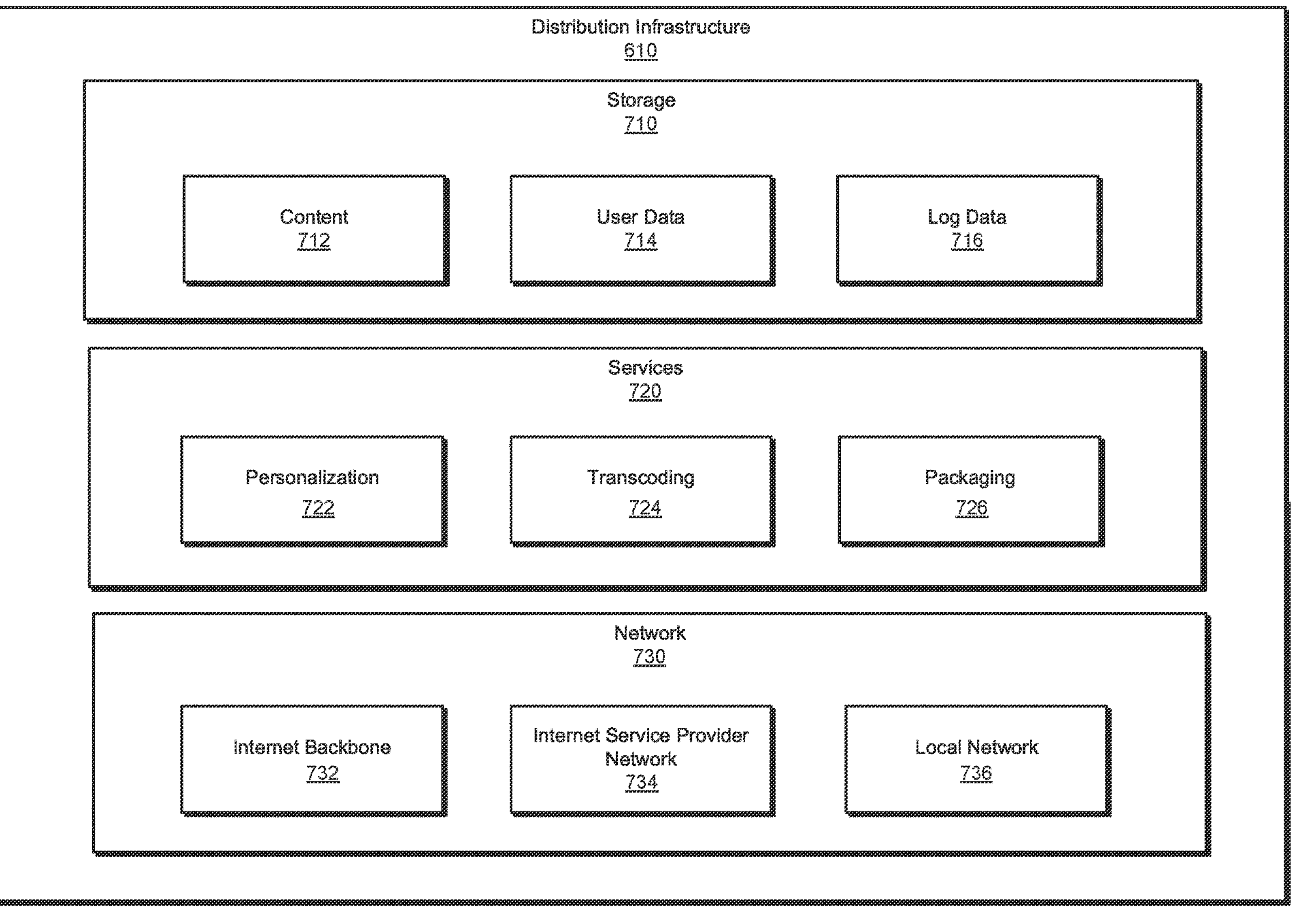
FIG. 7 is a block diagram of an exemplary distribution infrastructure within the content distribution ecosystem shown in FIG. 6.
Figure 8:
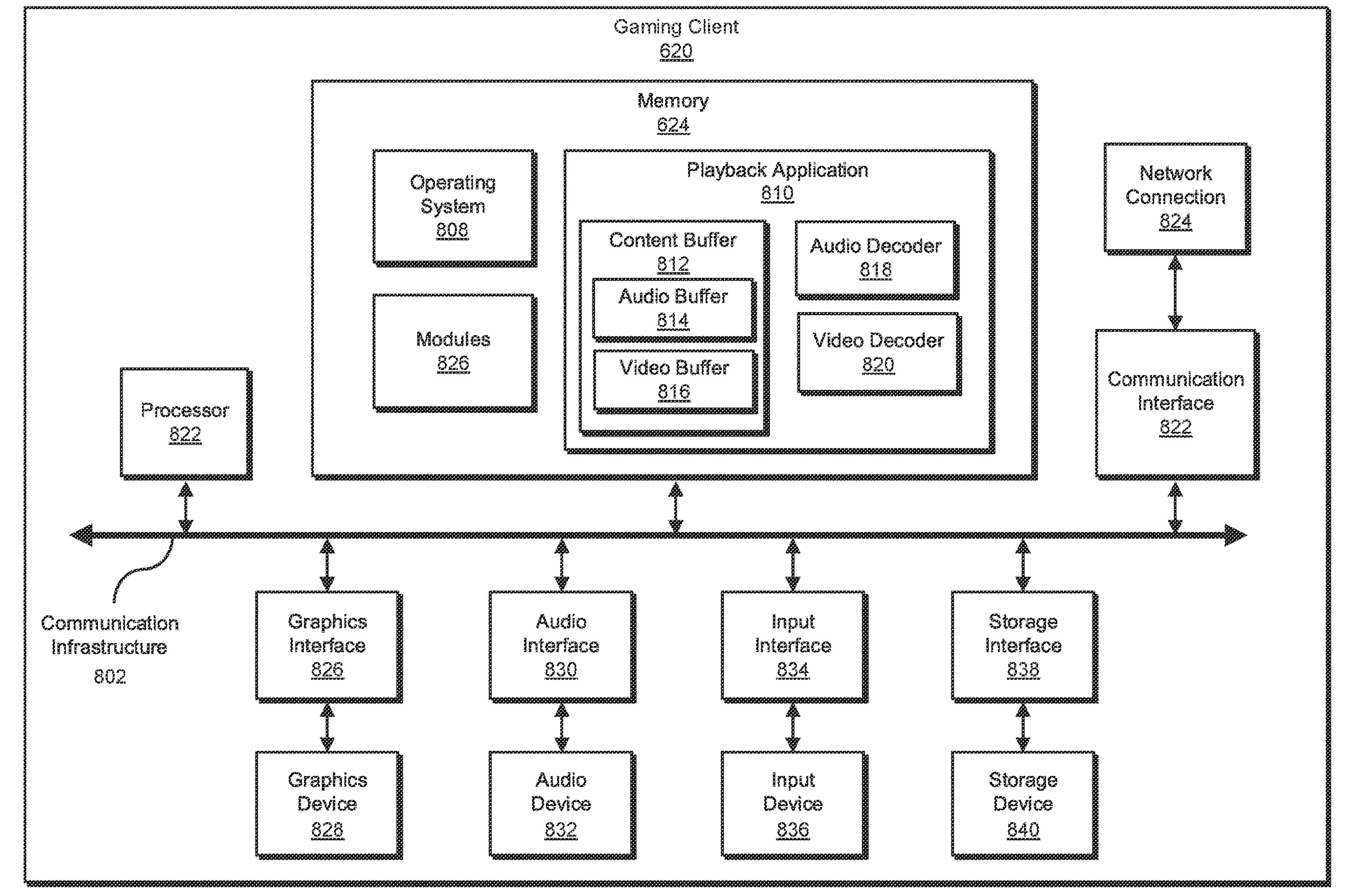
FIG. 8 is a block diagram of an exemplary content player within the content distribution ecosystem shown in FIG. 6.

FIGS. 6-8 illustrate cloud gaming systems, infrastructure, and clients that may be implemented with the embodiments herein. For example, the following will provide, with reference to FIG. 6, detailed descriptions of exemplary ecosystems in which content is provisioned to end nodes and in which requests for content are steered to specific end nodes. The discussion corresponding to FIGS. 7 and 8 presents an overview of an exemplary distribution infrastructure and an exemplary content player used during playback sessions, respectively.

FIG. 6 is a block diagram of a content distribution ecosystem 600 that includes a distribution infrastructure 610 in communication with a gaming client 620, content player, or other software application designed to present rendered graphics to a user. In some embodiments, distribution infrastructure 610 is configured to encode data at a specific data rate and to transfer the encoded data to gaming client 620. Gaming client 620 is configured to receive the encoded data via distribution infrastructure 610 and to decode the data for playback to a user. The data provided by distribution infrastructure 610 includes, for example, audio, video, text, images, animations, interactive content, haptic data, virtual or augmented reality data, location data, gaming data, or any other type of data that is provided via streaming.

Distribution infrastructure 610 generally represents any services, hardware, software, or other infrastructure components configured to deliver content to end users. For example, distribution infrastructure 610 includes content aggregation systems, media transcoding and packaging services, network components, and/or a variety of other types of hardware and software. In some cases, distribution infrastructure 610 is implemented as a highly complex distribution system, a single media server or device, or anything in between. In some examples, regardless of size or complexity, distribution infrastructure 610 includes at least one physical processor 612 and at least one memory device 614. One or more modules 616 are stored or loaded into memory 614 to enable adaptive streaming, as discussed herein.

Gaming client 620 generally represents any type or form of device or system capable of playing audio, video, or other gaming content that has been provided over distribution infrastructure 610. Examples of gaming client 620 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 610, gaming client 620 includes a physical processor 622, memory 624, and one or more modules 626. Some or all of the adaptive streaming processes described herein is performed or enabled by modules 626, and in some examples, modules 616 of distribution infrastructure 610 coordinate with modules 626 of gaming client 620 to provide adaptive streaming of multimedia content.

In certain embodiments, one or more of modules 616 and/or 626 in FIG. 6 represent one or more software applications or programs that, when executed by a computing device, cause the computing device to perform one or more tasks. For example, and as will be described in greater detail below, one or more of modules 616 and 626 represent modules stored and configured to run on one or more general-purpose computing devices. One or more of modules 616 and 626 in FIG. 6 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 612 and 622 generally represent any type or form of hardware-implemented processing unit capable of interpreting and/or executing computer-readable instructions. In one example, physical processors 612 and 622 access and/or modify one or more of modules 616 and 626, respectively. Additionally or alternatively, physical processors 612 and 622 execute one or more of modules 616 and 626 to facilitate adaptive streaming of multimedia content. Examples of physical processors 612 and 622 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 614 and 624 generally represent any type or form of volatile or non-volatile storage device or medium capable of storing data and/or computer-readable instructions. In one example, memory 614 and/or 624 stores, loads, and/or maintains one or more of modules 616 and 626. Examples of memory 614 and/or 624 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 7 is a block diagram of exemplary components of content distribution infrastructure 610 according to certain embodiments. Distribution infrastructure 610 includes storage 710, services 720, and a network 730. Storage 710 generally represents any device, set of devices, and/or systems capable of storing content for delivery to end users. Storage 710 includes a central repository with devices capable of storing terabytes or petabytes of data and/or includes distributed storage systems (e.g., appliances that mirror or cache content at Internet interconnect locations to provide faster access to the mirrored content within certain regions). Storage 710 is also configured in any other suitable manner.

As shown, storage 710 may store a variety of different items including content 712, user data 714, and/or log data 716. Content 712 includes television shows, movies, video games, user-generated content, and/or any other suitable type or form of content. User data 714 includes personally identifiable information (PII), payment information, preference settings, language and accessibility settings, and/or any other information associated with a particular user or content player. Log data 716 includes viewing history information, network throughput information, and/or any other metrics associated with a user's connection to or interactions with distribution infrastructure 610.

Services 720 includes personalization services 722, transcoding services 724, and/or packaging services 726. Personalization services 722 personalize recommendations, content streams, and/or other aspects of a user's experience with distribution infrastructure 610. Encoding services 724 compress media at different bitrates which, as described in greater detail below, enable real-time switching between different encodings. Packaging services 726 package encoded video before deploying it to a delivery network, such as network 730, for streaming.

Network 730 generally represents any medium or architecture capable of facilitating communication or data transfer. Network 730 facilitates communication or data transfer using wireless and/or wired connections. Examples of network 730 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 7, network 730 includes an Internet backbone 732, an internet service provider 734, and/or a local network 736. As discussed in greater detail below, bandwidth limitations and bottlenecks within one or more of these network segments triggers video and/or audio bit rate adjustments.

FIG. 8 is a block diagram of an exemplary implementation of gaming client 620 of FIG. 6. Gaming client 620 generally represents any type or form of computing device capable of reading computer-executable instructions. Gaming client 620 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 8, in addition to processor 622 and memory 624, gaming client 620 includes a communication infrastructure 802 and a communication interface 822 coupled to a network connection 824. Gaming client 620 also includes a graphics interface 826 coupled to a graphics device 828, an input interface 834 coupled to an input device 836, and a storage interface 838 coupled to a storage device 840.

Communication infrastructure 802 generally represents any type or form of infrastructure capable of facilitating communication between one or more components of a computing device. Examples of communication infrastructure 802 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 624 generally represents any type or form of volatile or non-volatile storage device or medium capable of storing data and/or other computer-readable instructions. In some examples, memory 624 stores and/or loads an operating system 808 for execution by processor 622. In one example, operating system 808 includes and/or represents software that manages computer hardware and software resources and/or provides common services to computer programs and/or applications on gaming client 620.

Operating system 808 performs various system management functions, such as managing hardware components (e.g., graphics interface 826, audio interface 830, input interface 834, and/or storage interface 838). Operating system 808 also provides process and memory management models for playback application 810. The modules of playback application 810 includes, for example, a content buffer 812, an audio decoder 818, and a video decoder 820.

Playback application 810 is configured to retrieve digital content via communication interface 822 and to play the digital content through graphics interface 826. Graphics interface 826 is configured to transmit a rendered video signal to graphics device 828. In normal operation, playback application 810 receives a request from a user to play a specific title or specific content. Playback application 810 then identifies one or more encoded video and audio streams associated with the requested title. After playback application 810 has located the encoded streams associated with the requested title, playback application 810 downloads sequence header indices associated with each encoded stream associated with the requested title from distribution infrastructure 610. A sequence header index associated with encoded content includes information related to the encoded sequence of data included in the encoded content.

In one embodiment, playback application 810 begins downloading the content associated with the requested title by downloading sequence data encoded to the lowest audio and/or video playback bitrates to minimize startup time for playback. The requested digital content file is then downloaded into content buffer 812, which is configured to serve as a first-in, first-out queue. In one embodiment, each unit of downloaded data includes a unit of video data or a unit of audio data. As units of video data associated with the requested digital content file are downloaded to the gaming client 620, the units of video data are pushed into the content buffer 812. Similarly, as units of audio data associated with the requested digital content file are downloaded to the gaming client 620, the units of audio data are pushed into the content buffer 812. In one embodiment, the units of video data are stored in video buffer 816 within content buffer 812 and the units of audio data are stored in audio buffer 814 of content buffer 812.

A video decoder 820 reads units of video data from video buffer 816 and outputs the units of video data in a sequence of video frames corresponding in duration to the fixed span of playback time. Reading a unit of video data from video buffer 816 effectively de-queues the unit of video data from video buffer 816. The sequence of video frames is then rendered by graphics interface 826 and transmitted to graphics device 828 to be displayed to a user.

An audio decoder 818 reads units of audio data from audio buffer 814 and outputs the units of audio data as a sequence of audio samples, generally synchronized in time with a sequence of decoded video frames. In one embodiment, the sequence of audio samples is transmitted to audio interface 830, which converts the sequence of audio samples into an electrical audio signal. The electrical audio signal is then transmitted to a speaker of audio device 832, which, in response, generates an acoustic output.

In situations where the bandwidth of distribution infrastructure 610 is limited and/or variable, playback application 810 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 826 is configured to generate frames of video data and transmit the frames of video data to graphics device 828. In one embodiment, graphics interface 826 is included as part of an integrated circuit, along with processor 622. Alternatively, graphics interface 826 is configured as a hardware accelerator that is distinct from (i.e., is not integrated within) a chipset that includes processor 622.

Graphics interface 826 generally represents any type or form of device configured to forward images for display on graphics device 828. For example, graphics device 828 is fabricated using liquid crystal display (LCD) technology, cathode-ray technology, and light-emitting diode (LED) display technology (either organic or inorganic). In some embodiments, graphics device 828 also includes a virtual reality display and/or an augmented reality display. Graphics device 828 includes any technically feasible means for generating an image for display. In other words, graphics device 828 generally represents any type or form of device capable of visually displaying information forwarded by graphics interface 826.

As illustrated in FIG. 8, gaming client 620 also includes at least one input device 836 coupled to communication infrastructure 802 via input interface 834. Input device 836 generally represents any type or form of computing device capable of providing input, either computer or human generated, to gaming client 620. Examples of input device 836 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Gaming client 620 also includes a storage device 840 coupled to communication infrastructure 802 via a storage interface 838. Storage device 840 generally represents any type or form of storage device or medium capable of storing data and/or other computer-readable instructions. For example, storage device 840 may be a magnetic disk drive, a solid-state drive, an optical disk drive, a flash drive, or the like. Storage interface 838 generally represents any type or form of interface or device for transferring data between storage device 840 and other components of gaming client 620.

Many other devices or subsystems are included in or connected to gaming client 620. Conversely, one or more of the components and devices illustrated in FIG. 8 need not be present to practice the embodiments described and/or illustrated herein. The devices and subsystems referenced above are also interconnected in different ways from that shown in FIG. 8. Gaming client 620 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into gaming client 620. All or a portion of the computer program stored on the computer-readable medium is then stored in memory 624 and/or storage device 840. When executed by processor 622, a computer program loaded into memory 624 causes processor 622 to perform and/or be a means for performing the functions of one or more of the example embodiments described and/or illustrated herein. Additionally or alternatively, one or more of the example embodiments described and/or illustrated herein are implemented in firmware and/or hardware. For example, gaming client 620 is configured as an Application Specific Integrated Circuit (ASIC) adapted to implement one or more of the example embodiments disclosed herein

EXAMPLE EMBODIMENTS

Example 1: A computer-implemented method comprising: accessing one or more media frame generation input events produced as part of a multimedia application on a media server, selecting at least one media frame that is to be rendered according to the one or more media frame generation input events, determining one or more graphics processing capabilities of a client device on which the selected media frame is to be rendered, generating a render command for the selected media frame based on the determined graphics processing capabilities of the client device, wherein the render command includes contextual graphics information and graphics processing unit (GPU) pipeline information for use in rendering the selected media frame on the client device, and transmitting the generated render command to the client device to initiate rendering of the selected media frame using the contextual graphics information and the GPU pipeline information.

Example 2: The computer-implemented method of Example 1, wherein the selected frame comprises a video frame.

Example 3: The computer-implemented method of Example 1 or Example 2, wherein the selected frame comprises an audio frame.

Example 4: The computer-implemented method of any of Examples 1-3, wherein the multimedia application comprises a video game.

Example 5: The computer-implemented method of any of Examples 1-4, wherein the generated render command is sent to a video game engine running on the client device.

Example 6: The computer-implemented method of any of Examples 1-5, wherein the contextual graphics information comprises at least one of: vector data for meshes, vector data specifying positions, vertex buffers, bitmap 2D/3D information, or non-vector 2D/3D information.

Example 7: The computer-implemented method of any of Examples 1-6, wherein the GPU pipeline information includes at least one of: texture sampler configuration information, viewport size, or stencil information.

Example 8: The computer-implemented method of any of Examples 1-7, further comprising compressing the contextual graphics information and the GPU pipeline information prior to transmission to the client device.

Example 9: The computer-implemented method of any of Examples 1-8, wherein client devices that have increased processing capabilities receive at least one additional portion of contextual graphics information or GPU pipeline information for use in rendering the selected media frame.

Example 10: The computer-implemented method of any of Examples 1-9, wherein the contextual graphics information includes 3D depth information, providing support for client devices having 3D display capabilities.

Example 11: The computer-implemented method of any of Examples 1-10, wherein the contextual graphics information includes different graphics information for each eye of a user.

Example 12: The computer-implemented method of any of Examples 1-11, wherein the render commands are generated on a distribution server that is within a specified physical distance from the client device.

Example 13: The computer-implemented method of any of Examples 1-12, wherein the media server controls the multimedia application's runtime.

Example 14: A system comprising: at least one physical processor, and physical memory comprising computer-executable instructions that, when executed by the physical processor, cause the physical processor to: access one or more media frame generation input events produced as part of a multimedia application on a media server, select at least one media frame that is to be rendered according to the one or more media frame generation input events, determine one or more graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

Example 15: The system of Example 14 or Example 15, wherein the media frame is part of a video game, and wherein the transmitted render commands allow the client device to start the video game without an installation phase and substantially without delay.

Example 16: The system of any of Examples 14-15, further comprising adapting the contextual graphics information based on the graphics processing capabilities of the client device.

Example 17: The system of any of Examples 14-16, wherein adapting the contextual graphics information based on the graphics processing capabilities of the client device comprises translating shader information to a format that will be understood by the client device.

Example 18: The system of any of Examples 14-17, wherein adapting the contextual graphics information based on the graphics processing capabilities of the client device comprises reducing a feature set in the contextual graphics information to provide a reduction in processing scope on the client device.

Example 19: The system of any of Examples 14-18, wherein the multimedia application comprises a video game, and wherein the generated render command is sent to a video game engine running on the client device.

Example 20: A non-transitory computer-readable medium comprising one or more computer-executable instructions that, when executed by at least one processor of a computing device, cause the computing device to: access one or more media frame generation input events produced as part of a multimedia application on a media server, select at least one media frame that is to be rendered according to the one or more media frame generation input events, determine one or more graphics processing capabilities of a client device on which the selected media frame is to be rendered, generate a render command for the selected media frame based on the determined graphics processing capabilities of the client device, wherein the render command includes contextual graphics information and graphics processing unit (GPU) pipeline information for use in rendering the selected media frame on the client device, and transmit the generated render command to the client device to initiate rendering of the selected media frame using the contextual graphics information and the GPU pipeline information.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

accessing one or more media frame generation input events produced as part of a multimedia application on a media server;

selecting at least one media frame that is to be rendered according to the one or more media frame generation input events;

determining one or more graphics processing capabilities of a client device on which the selected media frame is to be rendered;

generating, for execution on the client device, a render command for the selected media frame based on the determined graphics processing capabilities of the client device, wherein the render command includes contextual graphics information regarding the selected media frame and graphics processing unit (GPU) pipeline information for use in rendering the selected media frame on the client device; and transmitting the generated render command to a client engine running on the client device to initiate rendering of the selected media frame using the contextual graphics information and the GPU pipeline information.

2. The computer-implemented method of claim 1, wherein the selected media frame comprises a video frame.

3. The computer-implemented method of claim 1, wherein the selected media frame comprises an audio frame.

4. The computer-implemented method of claim 1, wherein the multimedia application comprises a video game.

5. The computer-implemented method of claim 4, wherein the generated render command is sent to a video game engine running on the client device.

6. The computer-implemented method of claim 1, wherein the contextual graphics information comprises at least one of: vector data for meshes, vector data specifying positions, vertex buffers, bitmap 2D/3D information, or non-vector 2D/3D information.

7. The computer-implemented method of claim 1, wherein the GPU pipeline information includes at least one of: texture sampler configuration information, viewport size, or stencil information.

8. The computer-implemented method of claim 1, further comprising compressing the contextual graphics information and the GPU pipeline information prior to transmission to the client device.

9. The computer-implemented method of claim 1, wherein client devices that have increased processing capabilities receive at least one additional portion of contextual graphics information or GPU pipeline information for use in rendering the selected media frame.

10. The computer-implemented method of claim 1, wherein the contextual graphics information includes 3D depth information, providing support for client devices having 3D display capabilities.

11. The computer-implemented method of claim 10, wherein the contextual graphics information includes different graphics information for each eye of a user.

12. The computer-implemented method of claim 1, wherein the render command is commands are generated on a distribution server that is within a specified physical distance from the client device.

13. The computer-implemented method of claim 12, wherein the media server controls the multimedia application's runtime.

14. A system comprising:

at least one physical processor; and physical memory comprising computer-executable instructions that, when executed by the physical processor, cause the physical processor to:

access one or more media frame generation input events produced as part of a multimedia application on a media server;

select at least one media frame that is to be rendered according to the one or more media frame generation input events;

determine one or more graphics processing capabilities of a client device on which the selected media frame is to be rendered;

generate, for execution on the client device, a render command for the selected media frame based on the determined graphics processing capabilities of the client device, wherein the render command includes contextual graphics information regarding the selected media frame and graphics processing unit (GPU) pipeline information for use in rendering the selected media frame on the client device; and transmit the generated render command to a client engine running on the client device to initiate rendering of the selected media frame using the contextual graphics information and the GPU pipeline information.

15. The system of claim 14, wherein the media frame is part of a video game, and wherein the transmitted render command commands allow the client device to start the video game without an installation phase and substantially without delay.

16. The system of claim 14, further comprising adapting the contextual graphics information based on the graphics processing capabilities of the client device.

17. The system of claim 16, wherein adapting the contextual graphics information based on the graphics processing capabilities of the client device comprises translating shader information to a format that will be understood by the client device.

18. The system of claim 16, wherein adapting the contextual graphics information based on the graphics processing capabilities of the client device comprises reducing a feature set in the contextual graphics information to provide a reduction in processing scope on the client device.

19. The system of claim 18, wherein the multimedia application comprises a video game, and wherein the generated render command is sent to a video game engine running on the client device.

20. A non-transitory computer-readable medium comprising one or more computer-executable instructions that, when executed by at least one processor of a computing device, cause the computing device to:

access one or more media frame generation input events produced as part of a multimedia application on a media server;

select at least one media frame that is to be rendered according to the one or more media frame generation input events;

determine one or more graphics processing capabilities of a client device on which the selected media frame is to be rendered;

generate, for execution on the client device, a render command for the selected media frame based on the determined graphics processing capabilities of the client device, wherein the render command includes contextual graphics information regarding the selected media frame and graphics processing unit (GPU) pipeline information for use in rendering the selected media frame on the client device; and transmit the generated render command to a client engine running on the client device to initiate rendering of the selected media frame using the contextual graphics information and the GPU pipeline information.

* * * * *